US008283032B2

(12) United States Patent
Kobayashi

(10) Patent No.: US 8,283,032 B2
(45) Date of Patent: Oct. 9, 2012

(54) ELECTRIC CONTACT MATERIAL, METHOD FOR MANUFACTURING THE ELECTRIC MATERIAL, AND ELECTRIC CONTACT

(75) Inventor: Yoshiaki Kobayashi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 175 days.

(21) Appl. No.: 12/531,731

(22) PCT Filed: Mar. 28, 2008

(86) PCT No.: PCT/JP2008/056213

§ 371 (c)(1),
(2), (4) Date: Oct. 20, 2009

(87) PCT Pub. No.: WO2008/123460

PCT Pub. Date: Oct. 16, 2008

(65) Prior Publication Data

US 2010/0101831 A1 Apr. 29, 2010

(30) Foreign Application Priority Data

Apr. 3, 2007 (JP) ................................ 2007-097785
Mar. 27, 2008 (JP) ................................ 2008-083320

(51) Int. Cl.
*D02G 3/00* (2006.01)
*H02G 3/00* (2006.01)

(52) U.S. Cl. ........................................ 428/375; 174/98

(58) Field of Classification Search .................. 428/209, 428/901, 467, 375; 439/886, 931; 174/98
See application file for complete search history.

(56) References Cited

U.S. PATENT DOCUMENTS 5,532,025 A * 7/1996 Kinlen et al. .............. 427/388.1
6,506,314 B1 1/2003 Whitney, Jr. et al.

(Continued)

FOREIGN PATENT DOCUMENTS

CN 1197110 A 10/1998

(Continued)

OTHER PUBLICATIONS

Office Action for Japanese Patent Application 2008-083320, Japan Patent Office, Apr. 5, 2011.

(Continued)

*Primary Examiner* — Cathy Lam
(74) *Attorney, Agent, or Firm* — Kubotera & Associates, LLC

(57) ABSTRACT

The present invention relates to an electrical contact material having a surface layer made of a noble metal or an alloy having the noble metal as its main component, a method for manufacturing the same and an electrical contact using the same. Recently, electrical contact materials having excellent abrasion resistance are used for sliding electrical contacts such as a connector terminal of an automobile harness, a contact switch mounted in a cellular phone and terminals of a memory card. Although there have been known ones having an organic coating film composed of either aliphatic amine or mercaptan or a mixture of the both provided on the electrical contact material described above as the electrical contact materials having excellent abrasion resistance, they have had problems that even though they are effective with a low load of 0.5 N or below, abrasion accelerates when the load exceeds 0.5 N and sliding characteristics drop under a high-temperature environment. The invention solves the abovementioned problems by providing an organic coating film formed of an organic compound containing aliphatic amine on the electrical contact material.

8 Claims, 2 Drawing Sheets

U.S. PATENT DOCUMENTS 8,002,595 B2 * 8/2011 Kobayashi .................... 439/886

FOREIGN PATENT DOCUMENTS

| | | | |
|---|---|---|---|
| JP | 61-23239 | B2 | 6/1986 |
| JP | 06-212491 | A | 8/1994 |
| JP | 7-73768 | A | 3/1995 |
| JP | 2003-183882 | A | 7/2003 |
| JP | 2004-67711 | A | 3/2004 |
| JP | 2004-084036 | A | 3/2004 |
| JP | 2006-206702 | A | 8/2006 |

OTHER PUBLICATIONS

Second Office Action for Chinese Patent Application 200880010743. X, The Patent Office of the People's Republic of China, Nov. 9, 2011.

* cited by examiner

ELECTRIC CONTACT MATERIAL, METHOD FOR MANUFACTURING THE ELECTRIC MATERIAL, AND ELECTRIC CONTACT

TECHNICAL FIELD

The present invention relates to an electrical contact material, a method for manufacturing the same, and an electrical contact using the same.

BACKGROUND ART

While copper or a copper alloy having excellent electrical conductivity have been used for electrical contact parts in the past, contact characteristics have been improved lately. Accordingly, usage of uncovered copper or copper alloy decreases, and products with various surface coatings applied on copper or a copper alloy increases. In particular, electrical contact materials with a noble metal coating applied on an electrical contact part are often used. Since Au, Ag, Pd, Pt, Ir, Rh, Ru and the like among the noble metals have stability and excellent electrical conductivity, they are used as various electrical contact materials. In particular, Ag has the most excellent electrical conductivity among metals and is relatively inexpensive among the noble metals. Accordingly, Ag is used in various fields.

Recently, electrical contact materials having excellent abrasion resistance are used for electrical contact materials associated with repetitive plugging and sliding such as a connector terminal and a sliding switch of an automobile harness, a contact switch mounted in a cellular phone, and terminals of a memory card. In general, contact materials using hard Ag and hard Au are used for improving abrasion resistance. A hard bright Ag plating material and others have been developed lately and are used for parts requiring various abrasion resistance since Ag is inexpensive as compared to Au, Pd and others. Still more, plating and cladding materials in which micro-particles are dispersed are also developed, and various materials in terms of sliding characteristics are developed for coating electrical contact materials.

Still more, there exist materials in which sealing or lubricant process is applied on a surface of the material after plating in order to improve sliding characteristics of the surface. For example, in Patent Document 1, pure Ag plating is applied, and an organic coating film formed of an aliphatic amine, mercaptan, or a mixture thereof is formed on the Ag plating to improve sulfuration resistance and abrasion resistance (see Japanese Patent Application No. H06-212491).

DISCLOSURE OF THE INVENTION

The conventional electrical contact materials on which the hard Ag or hard Ag plating process is implemented abrades less as compared to non-bright Ag material. However, when the conventional electrical contact materials are used at a part highly slidable with a relatively high load, a base material is easily exposed and causes oxidation and corrosion, thereby causing conductive failures. When a thickness of the noble metal increases to prevent a base material from being exposed, cost tends to increase due to expensive noble metal in a large amount. Further, in the conventional method of providing the organic coating film composed of an aliphatic amine, mercaptan, or a mixture thereof on the electrical contact material, it is effective for abrasion resistance with a low load of 0.5 N or below. However, when the load exceeds 0.5 N, abrasion accelerates, and when the load is 1 N to 1.5 N, sliding characteristics drop quickly. Further, the pure Ag layer is provided on the Ag alloy to form a double layer structure, thereby increasing manufacturing cost. Further, in the electrical contact material described above, the organic coating film does not have sufficient heat resistance, thereby decreasing sliding property under a high-temperature environment.

As a result of study on the abovementioned problems, the inventor has found that an electrical contact material having a surface layer composed of a noble metal or an alloy containing the noble metal as a main component and an organic coating film formed of an organic compound containing a aliphatic acid formed on the surface layer excels in abrasion resistance, sliding characteristics, and heat resistance. The present invention has been made from this finding.

That is, the invention provides the following means:

(1) An electrical contact material having a surface layer composed of a noble metal or an alloy whose main component is the noble metal, characterized in that an organic coating film formed of an organic compound containing aliphatic acid is provided on the surface of said surface layer.

(2) The electrical contact material according to the aspect (1), characterized in that a number of carbon atoms of said aliphatic acid is 8 to 50 (where, including a number of carbon in COOH).

(3) An electrical contact material having a surface layer composed of a noble metal or an alloy whose main component is the noble metal, characterized in that a first organic coating film layer composed of either aliphatic amine or mercaptan or a mixture of the both is provided on the surface of the surface layer and a second organic coating film formed of an organic compound containing aliphatic acid is provided on the surface of the first organic coating film layer.

(4) The electrical contact material according to the aspect (3), characterized in that a number of carbon atoms of said aliphatic acid is 8 to 50 (where, including a number of carbon in COOH).

(5) The electrical contact material according to the aspect (1) or (2), characterized in that the noble metal or the alloy whose main component is the noble metal forming the surface layer is Au, Ag, Cu, Pt, Pd or Ru or an alloy whose main component is either one or more of those noble metals.

(6) The electrical contact material according to the aspect (3) or (4), characterized in that said noble metal or the alloy whose component is the noble metal forming said surface layer is Ag or an alloy whose main component is Ag.

(7) A method for manufacturing the electrical contact material according any one of the aspects (1) through (6), characterized in that said surface layer made of said noble metal or the alloy whose main component is the noble metal is formed by a plating or cladding method.

(8) An electrical contact using the electrical contact material described in any one of the aspects (1) through (6).

The abovementioned and other features and advantages of the invention will be apparent from the following description with reference to the appended drawings.

BEST MODES FOR CARRYING OUT THE INVENTION

Electrical contact materials of the invention will be explained below.

"Noble metal" means a metal whose ionization tendency is smaller than hydrogen and is precious in the scope of the present description and claims.

"An electrical contact material having a surface layer composed of noble metal or an alloy whose main component is the noble metal" is an electrical contact material in which the noble metal or the alloy whose main component is the noble metal (containing the noble metal by 50 mass % or more) appears on the outermost surface before forming an organic coating film or organic coating film layer in the scope of the present description and claims.

A shape of the electrical contact material of the invention is not specifically limited, i.e., it may a plate, a rod, a wire, a tube, a strip, an atypical strip or the like, as long as it is used as an electrical contact material. The surface of the electrical contact material needs not be completely covered by the noble metal or the alloy thereof and the electrical contact material may be one whose part used as a contact material is partially exposed such as a stripe, a spot or the like, on a hoop strip.

"The alloy whose main component is the noble metal" is an alloy containing 50 mass % or more of noble metal as its content and is more preferably an alloy containing 70 mass % or more in the scope of the present description and claims.

Although the component of the noble metal or the alloy whose main component is the noble metal is not specifically limited in the electrical contact material of the invention, Au, Au—Ag alloy, Au—Cu alloy, Au—Ni alloy, Au—Co alloy Au—Pd alloy, Au—Fe alloy and the like may be cited for example as concrete examples of the gold (Au) and the Au alloy. As concrete examples of silver (Ag) and the Ag alloy, Ag—Cu alloy, Ag—Ni alloy, Ag—Se alloy, Ag—Sb alloy, Ag—Sn alloy, Ag—Cd alloy, Ag—Fe alloy, Ag—In alloy, Ag—Zn alloy, Ag—Li alloy, Ag—Co alloy, Ag—Pb alloy or the like may be cited for example. As concrete examples of copper (Cu) and the Cu alloy, Cu—Sn alloy, Cu—Zn alloy, Cu—Ag alloy, Cu—Au alloy, Cu—Ni alloy, Cu—Fe alloy or the like may be cited for example. As concrete examples of ruthenium (Ru) and the Ru alloy, Ru—Au alloy, Ru—Pb alloy, Ru—Pt alloy or the like may be cited for example.

Figure 1:
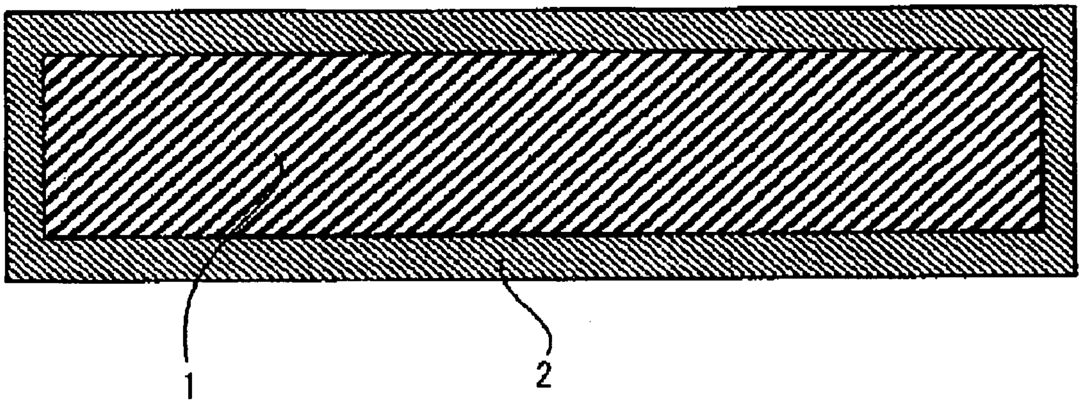
FIG. 1 is a section view of an electrical contact material according to an embodiment of the invention.

FIG. 1 is a section view of the electrical contact material according to one embodiment of the invention. FIG. 1 shows a mode in which an organic coating film 2 formed of the organic compound containing aliphatic acid is provided on the surface of the noble metal or the alloy 1 thereof.

Figure 2:
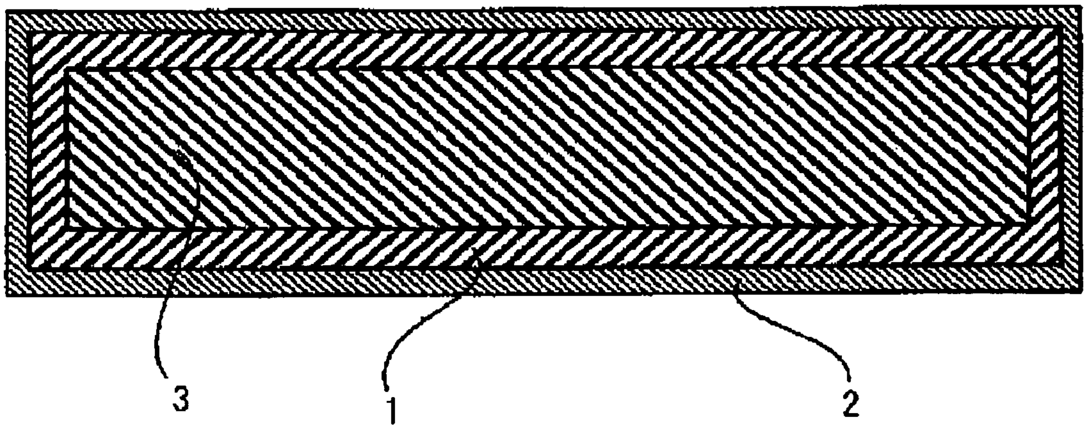
FIG. 2 is a section view of an electrical contact material according to another embodiment of the invention.

FIG. 2 is a section view of the electrical contact material according to another embodiment of the invention. FIG. 2 shows a mode in which a surface layer made of the noble metal or the alloy 1 thereof is formed on the surface of a base material 3 and the organic coating film 2 formed of the organic compound containing the aliphatic acid is provided on the surface of the surface layer.

Although the base material on which the surface layer made of the noble metal or the alloy whose main component is the noble metal of the invention is not specifically limited as long as it is used as the base material of the electrical contact material, copper (Cu) or its alloy, iron (Fe) or its alloy, nickel (Ni) or its alloy, aluminum (Al) or its alloy may be cited for example.

Still more, when the surface layer made of the noble metal or the alloy thereof is formed by means of plating, an arbitrary under layer such as nickel (Ni) and its alloy, cobalt (Co) and its alloy or Cu and its alloy may be provided appropriately to prevent diffusion of and to improve adhesion of the surface layer made of the noble metal or its alloy from/with the base material component. Still more, there may be a plurality of under layers and it is preferable to provide various underlying structures corresponding to coating, specifications, uses and the like. Although their thickness is not specifically limited, a thickness of the surface layer made of the noble metal or the alloy whose main component is the noble metal is preferable to be 0.01 to 10 μm or more preferably to be 0.1 to 2 μm including the under layer when use conditions, costs and others as the electrical contact material are considered.

The organic coating film formed on the surface of the surface layer made of the noble metal or its alloy is a heat-resistant organic coating film formed of the organic compound containing aliphatic acid.

The aliphatic acid is chain-like univalent carboxylic acid and is represented by a chemical formula $C_nH_mCOOH$, where n and m are integers. The aliphatic acid includes saturated aliphatic acid having no double-bond or triple-bond and non-saturated aliphatic acid having such bonds.

This organic coating film is a coating film having the aliphatic acid that physically or chemically absorb to the noble metal and heat resistance together with lubricating ability and is provided to improve corrosion resistance and lubrication.

Although the thickness of the organic coating film is not specifically limited in the invention, it is preferable to be 0.0001 to 0.1 μm preferably to be 0000.1 to 0.01 μm from an aspect of suppressing contact resistance from increasing.

While a short chain aliphatic acid whose number of carbon atoms is 1 to 7, a medium chain aliphatic acid whose number of carbon atoms is 8 to 10, and a long chain aliphatic acid whose number of carbon atoms is 12 or more may be cited as the aliphatic acid, an aliphatic acid whose number of carbon atoms is 8 to 50 is preferable or an aliphatic acid whose number of carbon atoms is 12 to 40 is more preferable if corrosiveness and stability of the aliphatic acid is considered. The number of carbon atoms includes a number of a carboxyl group (COOH).

As concrete examples of the preferable aliphatic acid in the invention, caprylic acid, capric acid, lauric acid, myristic acid, palmitic acid, stearic acid, behenic acid, cerotic acid, melissic acid and others as the saturated aliphatic acid and myristoleic acid, palmitoleic acid, organic coating film layereic acid, nervonic acid, linoleic acid, α-linolenic acid and others may be cited for example.

Although it is preferable to form the coating film by immersing the material having the surface layer made of the noble metal or the alloy whose main component is the noble metal into a solution containing the abovementioned organic compound and by drying as a method for forming the organic coating film, it is also possible to form the organic coating film by drying after passing through a solution mist containing the organic compound or wiping by a cloth containing the abovementioned organic compound.

Although concentration of the organic compound containing the aliphatic acid within the solution is not specifically limited, it may be used by dissolving into an adequate solvent such as toluene, acetone, trichloroethane, a commercially-sold synthetic solvent (e.g., NS Clean 100 W: produced by Japan Energy Co., Ltd.) and others so that the concentration is preferably 0.01 to 10 mass %. Although there is no specific limitation in connection with processing temperature and time in forming the organic coating film, the organic coating film having the target heat resistance may be formed by immersing in room temperature (25° C.) for one second or more (preferably 0.5 to 10 seconds).

Although the organic coating film may be processed by forming the organic coating film made of one type of aliphatic acid by two times or more, by forming the organic coating film composed of a mixed solution of aliphatic acids of two types or more by two times or more or by forming them alternately, it is preferable to form the organic coating film within three times at most when a number of steps and its cost are taken into consideration.

Next, a still other embodiment of the electrical contact material of the invention will be explained with reference to FIG. 3.

Figure 3:
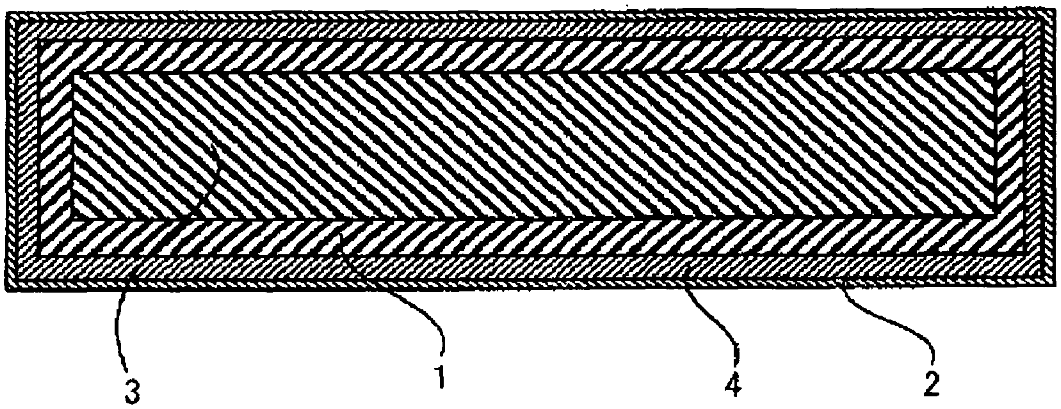
FIG. 3 is a section view of an electrical contact material according to a further embodiment of the invention.

FIG. 3 is a section view of the electrical contact material according to the still other embodiment of the invention. FIG. 3 shows a mode in which the surface layer made of the noble metal or the alloy 1 thereof is formed on the surface of the base material 3, a first organic coating film layer 4 composed of an aliphatic amine, mercaptan, or a mixture thereof on the surface layer and the organic coating film 2 formed of the organic compound containing the aliphatic acid is provided on the surface of the first organic coating film layer.

It is possible to the lubricating ability and corrosion resistance of the organic coating film formed on the surface of the surface layer made of the noble metal or the alloy thereof further by proving the first organic coating film layer composed of either the aliphatic amine or mercaptan or the mixture thereof and by forming the second organic coating film formed of the organic compound containing the aliphatic acid on the surface of the first organic coating film layer. More specifically, the first organic coating film layer composed of either the aliphatic amine or mercaptan or the mixture of the both is a coating film provided mainly for the purpose of improving corrosion resistance by implementing the process for forming the coating film layer of the aliphatic amine and mercaptan prone to absorb to the noble metal.

The aliphatic amine and mercaptan having 5 to 50 of number of carbon atoms are preferable as the aliphatic amine and mercaptan used in the invention and more specifically, dodecylamine, eicocylamine, nonylamine, dodecylmercaptan, octadecylmercaptan, eicocylmercaptan, nonylmercaptan and others may be cited.

Although it is preferable to form the coating film by immersing the material having the surface layer made of the noble metal or the alloy whose main component is the noble metal into a solution containing the aliphatic amine and mercaptan as a method for forming the first organic coating film layer, it is also possible to form the coating film layer by passing through a solution mist containing the aliphatic amine or the like or wiping by a wet cloth containing the abovementioned solution.

Although concentration of the aliphatic amine and mercaptan within the solution is not specifically limited, it may be used by dissolving into an adequate solvent such as toluene, acetone, trichloroethane, a commercially-sold synthetic solvent and others so that the concentration is preferably 0.01 to 10 mass %. Although there is no specific limitation in connection with processing temperature and time in forming the organic coating film layer, the target organic coating film layer may be formed by immersing in room temperature (25° C.) for 0.1 second or more (preferably 0.5 to 10 seconds).

Although the organic coating film layer may be processed by forming the organic coating film layer made of one type of aliphatic amine or mercaptan by two times or more, by forming the organic coating film layer by two times or more by using the mixed solution containing two or more types of aliphatic amine or mercaptan or by forming them alternately, it is preferable to form the organic coating film layer within three times at most when a number of steps and its cost are taken into consideration.

The second organic coating film composed of the organic compound containing the aliphatic acid is formed on the surface of the first organic coating film layer after forming the first organic coating film layer. In addition to the effect described above, the second organic coating film is a coating film provided to protect from sliding unbearable by the first organic coating film layer when it is used as a sliding contact to which a relatively high load is applied and having an effect of protecting the corrosion resistance of the first organic coating film layer for a long period time. The second organic coating film may be formed by implementing the coating film forming process in the same manner as described above after providing the first organic coating film layer composed of either the aliphatic amine, mercaptan or the mixture of the both.

Although thicknesses of the first organic coating film layer and the second organic coating film are not specifically limited, they are preferable to be 0.0001 to 0.1 μm and more preferable to be 0.0001 to 0.01 μm, respectively, from the aspect of suppressing an increase of contact resistance.

Although the both processes of forming only the organic coating film composed of the organic compound containing aliphatic acid and of forming the organic coating film composed of the organic compound containing the aliphatic acid after forming the organic coating film composed of either aliphatic amine or mercaptan or the mixture of the both are effective for all noble metals and their alloys in terms of these processes, the anterior process exhibits a strong effect in connection with Au, Ag, Pd, Pt, Ir, Rh and Ru or an alloy whose main component is anyone or more of these noble metals and the posterior process exhibits a particular effect with Ag or an alloy whose main component is Ag.

It is also possible to expect that the organic coating film adsorbs more strongly and that the corrosion resistance and lubricating ability are improved further by forming the surface layer composed of the noble metal or its alloy by a plating or cladding method because a state of the outermost surface layer before forming the organic coating film is active as compared to the case of other coating methods.

An electrical contact using the electrical contact material of the invention formed by these methods has better corrosion resistance as compared to the conventional contact materials and has excellent abrasion resistance as compared to the conventional materials as a contact material involved in sliding.

The electrical contact of the invention includes electrical contacts that involve in repetitive plugging and sliding, such as a connector terminal and a sliding switch of automobile harnesses, a contact switch mounted in cellular phones and terminals of memory cards and PC cards.

The electrical contact material of the invention excels in the sliding characteristics by having the abrasion resistance even for a relatively high load of around 1 N and has the corrosion resistance and heat resistance.

The manufacturing method of the invention allows the electrical contact materials having the greater corrosion resistance and lubricating ability and excellent in the sliding characteristics to be manufactured.

EMBODIMENTS

While embodiments of the invention will be explained below in detail, the invention is not limited them.

First Embodiment

After performing pre-processing of electrolytic degreasing and acid pickling of a C14410 strip (base material) of 0.3 mm thick and 180 mm width, a plating component of 0.5 μm of plating thickness shown in Table 1 was fabricated. Next, the process for forming the organic coating film was implemented on the plating component thus obtained to obtain electrical contact materials of the first through 12th examples of the invention and first through eighth comparative examples having the organic coating film of 0.01 μm thick shown in Table 1. Still more, an Ag-5% Sb alloy was cladded on the base material by an ordinary method and a process of forming the coating film layer of mercaptan was implemented on the clad material thus obtained to obtain an electrical contact material of a first prior art example A sulfuration test was carried out to determine the corrosion resistance with respect to the above-mentioned electrical contact materials. Evaluation was carried out by digitizing its results by rating numbers (hereinafter denoted as "RN"). Criterion of the RN is the standard chart described in JIS H8502 and indicates that the greater the numerical value, the better the corrosion resistance. Still more, a coefficient of dynamic friction at part used as a sliding electrical contact was measured to find the sliding characteristics and the coefficients of dynamic friction after sliding by 100 times were described in Table 1 together with the results of the sulfuration test described above.

The preprocessing and plating conditions described above will be described below.

(Pre-Processing Conditions)

[Electrolytic Degreasing]

Degreasing solution: NaOH 60 g/l

Degreasing conditions: 2.5 A/dm$^2$, 60° C. in temperature, 60 seconds of degreasing time

[Acid Pickling]

Acid pickling solution: 10% sulfuric acid

Acid pickling conditions: 30 seconds of immersion, room temperature (25° C.)

(Plating Conditions)

[Au Plating]

Plating solutions: $KAu(CN)_2$ 14.6 g/l, $C_6H_8O_7$ 150 g/l, $K_2C_6H_4O_7$ 180 g/l Plating conditions: 1 A/dm$^2$ of current density and 40° C. in temperature

[Au—Co Plating]

Plating solutions: $KAu(CN)_2$ 14.6 g/l, $C_6H_8O_7$ 150 g/l, $K_2C_6H_4O_7$ 180 g/l, EDTA-Co(II) 3 g/l, piperazine 2 g/l Plating conditions: 1 A/dm$^2$ of current density, 40° C. in temperature

[Ag Plating]

Plating solutions: AgCN 50 g/l, KCN 100 g/l, $K_2CO_3$ 30 g/l

Plating conditions: 0.5 to 3 A/dm$^2$ of current density and 30° C. in temperature

[Cu plating]

Plating solutions: $CuSO_4.5H_2O$ 250 g/l, $H_2SO_4$ 50 g/l, NaCl 0.1 g/l

Plating conditions: 6 A/dm$^2$ of current density and 40° C. in temperature

[Pd Plating]

Plating solutions: $Pd(NH_3)_2Cl_2$ 45 g/l, $NH_4OH$ 90 ml/l, $(NH_4)SO_4$ 50 g/l Plating conditions: 1 A/dm$^2$ of current density and 30° C. in temperature

[Pd—Ni alloy plating: Pd/Ni (%) 80/20]

Plating solutions: $Pd(NH_3)_2Cl_2$ 40 g/l, $NiSO_4$ 45 g/l, $NH_4OH$ 90 ml/l, $(NH_4)_2SO_4$ 50 g/l Plating conditions: 1 A/dm$^2$ of current density and 30° C. in temperature

[Ru Plating]

Plating solutions: $RuNOCl_3.5H_2O$ 10 g/l, $NH_2SO_3H$ 15 g/l

Plating conditions: 1 A/dm$^2$ of current density and 50° C. in temperature

[Pt Plating]

Plating solutions: $Pt(NO_2)_2(NH_3)_2$ 10 g/l, $NaNO_2$ 100 g/l, $NH_4NO_3$ 100 g/l Plating conditions: 5 A/dm$^2$ of current density and 90° C. in temperature Conditions for forming the organic coating film will be described below. The heat-resistant organic coating films within Table 1 are types of immersion solutions described below.

Immersion solution: 0.5 mass % aliphatic acid solution (solvent: toluene)

Immersion conditions: normal temperature (25° C.), immersed for five seconds

Drying: 40° C. for 30 seconds

Further, conditions for forming the nonylmercaptan coating film layer of the prior art example were as follows. The heat-resistant organic coating films within Table 1 are types of immersion solutions described below.

Immersion solution: 0.2 mass % mercaptan solution (solvent: toluene)

Immersion conditions: normal temperature (25° C.), immersed for five seconds

Drying: 40° C. for 30 seconds

Conditions of the sulfuration test and the measurement of the coefficient of dynamic friction are as follows.

[Sulfuration Test]

Sulfuration test conditions: $H_2S$ 3 ppm, 40° C.), 48 hours, 80% Rh

[Measurement of Coefficient of Dynamic Friction]

Measurement conditions: steel ball probe of R (radius)=3.0 mm, sliding distance: 10 mm, sliding speed: 100 mm/second, sliding number of times: 100 times, load: 1 N, 65% Rh, 25° C.

[Table 1]

TABLE 1

| | OUTERMOST SURFACE LAYER | HEAT-RESISTANT ORGANIC COATING FILM | RN | COEFFICIENT OF DYNAMIC FRICTION |
|---|---|---|---|---|
| 1$^{ST}$ EXAMPLE OF THE INVENTION | pure Au | stearic acid | 9.3 | 0.35 |
| 2$^{ND}$ EXAMPLE OF THE INVENTION | Au—0.3% Co | stearic acid | 9.5 | 0.3 |
| 3$^{RD}$ EXAMPLE OF THE INVENTION | pure Ag | stearic acid | 7 | 0.3 |
| 4$^{TH}$ EXAMPLE OF THE INVENTION | pure Ag | caprylic acid | 7 | 0.3 |
| 5$^{TH}$ EXAMPLE OF THE INVENTION | pure Ag | oleic acid | 7 | 0.3 |

TABLE 1-continued

| | OUTERMOST SURFACE LAYER | HEAT-RESISTANT ORGANIC COATING FILM | RN | COEFFICIENT OF DYNAMIC FRICTION |
|---|---|---|---|---|
| $6^{TH}$ EXAMPLE OF THE INVENTION | pure Ag | α-linolenic acid | 7 | 0.3 |
| $7^{TH}$ EXAMPLE OF THE INVENTION | pure Ag | linoleic acid | 7 | 0.3 |
| $8^{TH}$ EXAMPLE OF THE INVENTION | pure Cu | stearic acid | 8 | 0.35 |
| $9^{TH}$ EXAMPLE OF THE INVENTION | pure Pt | stearic acid | 9.5 | 0.35 |
| $10^{TH}$ EXAMPLE OF THE INVENTION | pure Pd | stearic acid | 9.5 | 0.35 |
| $11^{TH}$ EXAMPLE OF THE INVENTION | Pd—20% Ni | stearic acid | 9.5 | 0.35 |
| $12^{TH}$ EXAMPLE OF THE INVENTION | pure Ru | stearic acid | 9 | 0.3 |
| $1^{ST}$ COMPARATIVE EXAMPLE | pure Au | nil | 9 | 0.8 |
| $2^{ND}$ COMPARATIVE EXAMPLE | Au—0.3% Co | nil | 9 | 0.8 |
| $3^{RD}$ COMPARATIVE EXAMPLE | pure Ag | nil | 3 | 1.0 |
| $4^{TH}$ COMPARATIVE EXAMPLE | pure Cu | nil | 5 | 1.0 |
| $5^{TH}$ COMPARATIVE EXAMPLE | pure Pt | nil | 9 | 0.9 |
| $6^{TH}$ COMPARATIVE EXAMPLE | pure Pd | nil | 9 | 0.9 |
| $7^{TH}$ COMPARATIVE EXAMPLE | Pd—20% Ni | nil | 9 | 0.9 |
| $8^{TH}$ COMPARATIVE EXAMPLE | pure Ru | nil | 8 | 0.8 |
| $1^{ST}$ PRIOR ART EXAMPLE | Ag—5% Sb | nonylmercaptan | 7 | 1.0 |

"The outermost surface layer" in Table 1 means a surface layer where the noble metal or the alloy whose main component is the noble metal appears before forming the organic coating film or the organic coating film layer. The same applies also to Table 2.

As it is apparent from Table 1, it can be seen that the corrosion resistance (RN) and the sliding characteristics (coefficient of dynamic friction) have remarkably improved by providing the organic coating film composed of the organic compound containing the aliphatic acid on the surface of the noble metal or its alloy. Still more, it can be seen from the result that the coefficient of dynamic friction rises when the load is 1 N in the prior art example 1.

Second Embodiment

After performing pre-processing of electrolytic degreasing and acid pickling of a C14410 strip (base material) of 0.3 mm thick and 180 mm width, a plating component of 0.5 μm of plating thickness shown in Table 2 was fabricated. Next, the process for forming the organic coating film was implemented on the plating component thus obtained to obtain electrical contact materials of the 13th through 26th examples of the invention having the organic coating film layer of 0.01 μm thick and the second organic coating film of 0.01 μm thick. Still more, the electrical contact materials of the first through eighth comparative examples and the prior art example described for the purpose of comparison were described conforming to Table 2.

Conditions for forming the coating film will be described below. The first organic coating film layers and the second heat-resistant organic coating films within Table 2 are types of immersion solutions described below.

(Formation of First Organic Coating Film Layer)

Immersion solution: 0.2 mass % aliphatic amine or mercaptan solution (solvent: toluene)

Immersion conditions: normal temperature (25° C.), immersed for five seconds

Drying: 40° C. for 30 seconds (Formation of Second Organic Coating Film)

Immersion solution: 1.0 mass % aliphatic acid solution (solvent: NS Clean 100 W)

Immersion conditions: room temperature (25° C.), immersed for five seconds

Drying: 40° C. for 30 seconds

A sulfuration test was carried out to determine the corrosion resistance with respect to the above-mentioned electrical contact materials. Evaluation was carried out by digitizing its results by RN in the same manner with the first embodiment. Still more, a coefficient of dynamic friction at part used as a sliding electrical contact was measured to find the sliding characteristics and the coefficients of dynamic friction after sliding by 100 times were described in Table 2 together with the results of the sulfuration test.

Conditions of the measurement of the coefficient of dynamic friction are as follows.

[Measurement of Coefficient of Dynamic Friction]

Measurement conditions: steel ball probe of R(radius)=3.0 mm, sliding distance: 10 mm, sliding speed: 100 mm/second, sliding number of times: 100 times, load: 1.5 N, 65% Rh, 25° C.

[Table 2]

TABLE 2

| | MOST SURFACE LAYER | FIRST ORGANIC COATING FILM | SECOND HEAT-RESISTANT ORGANIC COATING FILM | RN | COEFFICIENT OF DYNAMIC FRICTION |
|---|---|---|---|---|---|
| $13^{TH}$ EXAMPLE OF THE INVENTION | pure Au | octadecylmercaptan | stearic acid | 9.8 | 0.3 |
| $14^{TH}$ EXAMPLE OF THE INVENTION | Au—0.3% Co | octadecylmercaptan | stearic acid | 9.8 | 0.25 |

TABLE 2-continued

| | MOST SURFACE LAYER | FIRST ORGANIC COATING FILM | SECOND HEAT-RESISTANT ORGANIC COATING FILM | RN | COEFFICIENT OF DYNAMIC FRICTION |
|---|---|---|---|---|---|
| $15^{TH}$ EXAMPLE OF THE INVENTION | pure Ag | octadecylmercaptan | stearic acid | 9 | 0.25 |
| $16^{TH}$ EXAMPLE OF THE INVENTION | pure Ag | dodecylamine | stearic acid | 9 | 0.25 |
| $17^{TH}$ EXAMPLE OF THE INVENTION | pure Ag | eicocylamine | stearic acid | 9 | 0.25 |
| $18^{TH}$ EXAMPLE OF THE INVENTION | pure Ag | nonylamine | stearic acid | 9 | 0.25 |
| $19^{TH}$ EXAMPLE OF THE INVENTION | pure Ag | dodecylmercaptan | stearic acid | 9 | 0.25 |
| $20^{TH}$ EXAMPLE OF THE INVENTION | pure Ag | eicocylmercaptan | stearic acid | 9 | 0.25 |
| $21^{ST}$ EXAMPLE OF THE INVENTION | pure Ag | nonylmercaptan | stearic acid | 9 | 0.25 |
| $22^{ND}$ EXAMPLE OF THE INVENTION | pure Cu | octadecylmercaptan | stearic acid | 9 | 0.3 |
| $23^{RD}$ EXAMPLE OF THE INVENTION | pure Pt | octadecylmercaptan | stearic acid | 9.8 | 0.3 |
| $24^{TH}$ EXAMPLE OF THE INVENTION | pure Pd | octadecylmercaptan | stearic acid | 9.8 | 0.3 |
| $25^{TH}$ EXAMPLE OF THE INVENTION | Pd—20% Ni | octadecylmercaptan | stearic acid | 9.8 | 0.3 |
| $26^{TH}$ EXAMPLE OF THE INVENTION | pure Ru | octadecylmercaptan | stearic acid | 9.8 | 0.25 |
| $1^{ST}$ COMPARATIVE EXAMPLE | pure Au | nil | nil | 9 | 0.8 |
| $2^{ND}$ COMPARATIVE EXAMPLE | Au—0.3% Co | nil | nil | 9 | 0.8 |
| $3^{RD}$ COMPARATIVE EXAMPLE | pure Ag | nil | nil | 3 | 1.0 |
| $4^{TH}$ COMPARATIVE EXAMPLE | pure Cu | nil | nil | 5 | 1.0 |
| $5^{TH}$ COMPARATIVE EXAMPLE | pure Pt | nil | nil | 9 | 0.9 |
| $6^{TH}$ COMPARATIVE EXAMPLE | pure Pd | nil | nil | 9 | 0.9 |
| $7^{TH}$ COMPARATIVE EXAMPLE | Pd—20% Ni | nil | nil | 9 | 0.9 |
| $8^{TH}$ COMPARATIVE EXAMPLE | pure Ru | nil | nil | 8 | 0.8 |
| $1^{ST}$ PRIOR ART EXAMPLE | Ag—5% Sb | nonylmercaptan | nil | 7 | 1.0 |

As it is apparent from Table 2, it can be seen that the corrosion resistance (RN) and the sliding characteristics (coefficient of dynamic friction) have improved further in the 13th to 26th embodiments in which the organic coating film composed of either the aliphatic amine or mercaptan or the mixture of the both is provided on the surface of the noble metal or its alloy and the organic coating film formed of the organic compound containing the aliphatic acid is provided on its upper layer as compared to the first through 12th embodiments in which only the organic coating film formed of the organic compound containing the aliphatic acid in Table 1 is provided. In particular, it can be seen that not only the sliding characteristics (coefficient of dynamic friction), but also the corrosion resistance (RN) has remarkably improved further as for Ag.

Third Embodiment

After performing pre-processing of electrolytic degreasing and acid pickling of a C26800 strip (base material) of 0.64 mm thick and 150 mm width, materials of the first surface layer of 0.005 μm thick and of the second organic coating film (stearic acid) of 0.005 μm thick were obtained after implementing 1.0 μm thick of pure Ag plating (27th to 37th examples of the invention).

Still more, a material of Ag-5% Sb plating+nonylmercaptan in which only the first organic coating film layer of 0.005 μm thick was formed was obtained as a prior art example. (second prior art example).

After performing heat treatments under heating conditions shown in Table 3 for the 27th to 37th examples of the invention, the second prior art example and the first through eighth comparative examples shown in Table 1, the coefficient of dynamic friction was measured in the same manner with the first embodiment. Table 3 shows its results.

[Table 3]

TABLE 3

| | HEATING CONDITIONS | | COEFFICIENT OF DYNAMIC FRICTION | | | |
|---|---|---|---|---|---|---|
| | HEATING TEMPERATURE | HEATING TIME | FIRST TIME | $10^{TH}$ TIME | $50^{TH}$ TIME | $100^{TH}$ TIME |
| EXAMPLES OF THE INVENTION | | | | | | |
| 27 | — | — | 0.05 | 0.1 | 0.25 | 0.3 |
| 28 | 50 | 24 | 0.05 | 0.1 | 0.25 | 0.3 |
| 29 | 50 | 120 | 0.05 | 0.15 | 0.25 | 0.3 |
| 30 | 50 | 720 | 0.05 | 0.15 | 0.25 | 0.3 |

TABLE 3-continued

| | HEATING CONDITIONS | | COEFFICIENT OF DYNAMIC FRICTION | | | |
|---|---|---|---|---|---|---|
| | HEATING TEMPERATURE | HEATING TIME | FIRST TIME | $10^{TH}$ TIME | $50^{TH}$ TIME | $100^{TH}$ TIME |
| 31 | 50 | 4320 | 0.1 | 0.15 | 0.25 | 0.35 |
| 32 | 50 | 8760 | 0.1 | 0.15 | 0.3 | 0.35 |
| 33 | 80 | 24 | 0.05 | 0.1 | 0.25 | 0.3 |
| 34 | 80 | 120 | 0.1 | 0.15 | 0.25 | 0.3 |
| 35 | 80 | 720 | 0.1 | 0.2 | 0.25 | 0.35 |
| 36 | 80 | 4320 | 0.15 | 0.2 | 0.25 | 0.35 |
| 37 | 80 | 8760 | 0.15 | 0.25 | 0.3 | 0.35 |
| COMPARATIVE EXAMPLES | | | | | | |
| 1 | 50 | 24 | 0.25 | 0.4 | 0.7 | 0.8 |
| 2 | 50 | 24 | 0.2 | 0.35 | 0.7 | 0.8 |
| 3 | 50 | 24 | 0.2 | 0.4 | 0.8 | 1 |
| 4 | 50 | 24 | 0.15 | 0.35 | 0.8 | 1 |
| 5 | 50 | 24 | 0.2 | 0.35 | 0.75 | 0.9 |
| 6 | 50 | 24 | 0.2 | 0.35 | 0.75 | 0.9 |
| 7 | 50 | 24 | 0.15 | 0.3 | 0.75 | 0.9 |
| 8 | 50 | 24 | 0.2 | 0.3 | 0.7 | 0.8 |
| PRIOR ART EXAMPLE | | | | | | |
| 2 | 50 | 24 | 0.1 | 0.25 | 0.75 | 1 |

As it is apparent from Table 3, it can be seen that the examples of the invention excel in the sliding characteristics (coefficient of dynamic friction) and have the excellent heat resistance.

INDUSTRIAL APPLICABILITY

The electrical contact material of the invention may be suitably used as an electrical contact such as a slide switch and tact switch that involve sliding with a long life.

Still more, because the electrical contact of the invention is excels in the corrosion resistance and abrasion resistance, its life is long and is suitable for the slide switch and tact switch that involve sliding.

While the invention has been described with its embodiments, the inventors have no intention of limiting any detail of the explanation of the invention unless specifically specified and consider that the invention should be construed widely without going against the spirit and scope of the invention indicated by the scope of the appended Claims.

This application claims priority from Japanese patent applications No. 2007-097785 filed on Apr. 3, 2007 and No. 2008-083320 filed on Mar. 27, 2008. The entire content of which is incorporated herein by reference.

The invention claimed is:

1. An electrical contact material comprising:

a surface layer formed of a noble metal or an alloy containing the noble metal as a main component thereof; and an organic coating film formed on a surface of the surface layer and formed of an organic compound containing an aliphatic acid;

wherein the aliphatic acid is represented by $C_nH_mCOOH$, where n and m are integers; and the aliphatic acid has 8 to 50 carbon atoms, including the carbon atom in COOH of the aliphatic acid.

2. The electrical contact material according to claim 1, wherein said noble metal or said alloy containing the noble metal as the main component thereof forming the surface layer is Au, Ag, Cu, Pt, Pd, Ru or an alloy containing one or more of Au, Ag, Cu, Pt, Pd, and Ru as a main component thereof.

3. The electrical contact material according to claim 1, wherein the aliphatic acid is a saturated aliphatic acid selected from the group consisting of caprylic acid, capric acid, lauric acid, myristic acid, palmitic acid, stearic acid, behenic acid, cerotic acid, and melissic acid; or an unsaturated aliphatic acid selected from the group consisting of myristoleic acid, palmitoleic acid, oleic acid, nervonic acid, linoleic acid, and α-linolenic acid.

4. The electrical contact material according to claim 1, wherein the organic coating film has a thickness of 0.0001 to 0.1 μm.

5. An electrical contact material comprising:

a surface layer formed of a noble metal or an alloy containing the noble metal as a main component thereof;

a first organic coating film layer formed on a surface of the surface layer and formed of an aliphatic amine, mercaptan, or a mixture thereof; and a second organic coating film formed on a surface of the first organic coating film layer and formed of an organic compound containing an aliphatic acid;

wherein the aliphatic acid is represented by $C_nH_mCOOH$, where n and m are integers;

the aliphatic acid has 8 to 50 carbon atoms, including the carbon atom in COOH of the aliphatic acid; and the aliphatic amine and the mercaptan each have 5 to 50 carbon atoms.

6. The electrical contact material according to claim 5, wherein said noble metal or said alloy containing the noble metal as the main component thereof forming the surface layer is Ag or an alloy containing Ag as a main component thereof.

7. The electrical contact material according to claim 5, wherein the aliphatic acid is a saturated aliphatic acid selected from the group consisting of caprylic acid, capric acid, lauric acid, myristic acid, palmitic acid, stearic acid, behenic acid, cerotic acid, and melissic acid; or an unsaturated aliphatic acid selected from the group consisting of myristoleic acid, palmitoleic acid, oleic acid, nervonic acid, linoleic acid, and α-linolenic acid; and the aliphatic amine and mercaptan is selected from the group consisting of dodecylamine, eicocylamine, nonylamine, dodecylmercaptan, octadecylmercaptan, eicocylmercaptan, and nonylmercaptan.

8. The electrical contact material according to claim 5, wherein the first organic coating film layer and the second organic coating film layer have a thickness of 0.0001 to 0.1 μm, respectively.

* * * * *